April 21, 1942.   C. P. TRUDELL   2,280,359
SHEET METAL FORMING APPARATUS
Filed June 10, 1939   2 Sheets-Sheet 1

INVENTOR
CHARLES P. TRUDELL.
BY
ATTORNEY

April 21, 1942. C. P. TRUDELL 2,280,359
SHEET METAL FORMING APPARATUS
Filed June 10, 1939 2 Sheets-Sheet 2

INVENTOR
CHARLES P. TRUDELL
BY
ATTORNEY

Patented Apr. 21, 1942

2,280,359

UNITED STATES PATENT OFFICE 2,280,359

SHEET METAL FORMING APPARATUS

Charles P. Trudell, Buffalo, N. Y., assignor to Curtiss-Wright Corporation, a corporation of Delaware Application June 10, 1939, Serial No. 278,413

5 Claims. (Cl. 113—44)

The present invention relates to the pressing and forming of objects from sheet material, relating particularly to improvements in resilient dies in that class of operation in which a metal blank is placed over a metallic forming die, whereupon a sheet of rubber or the like is pressed firmly upon the metal blank to cause conformation of same to the contour of the metal die.

An object of the invention is to provide an improved form of rubber die by which portions thereof may be readily replaced when worn.

A further object is to provide a sectional rubber die and supporting means for the several sections thereof which are adjustable, so that the exposed surface of the rubber die may be adjusted to conform approximately to the shape of the metallic die with which the rubber die engages.

A further object is to provide a plurality of identical rubber die sections and adjustable supporting means therefor so that the general contour of the exposed surface of the rubber die may be made irregular without altering the thickness of the rubber components thereof.

Still another object is to provide improved means for pressing the blanks of sheet material into odd shapes, and to provide means by which deep drawing operations may be performed by the use of a combination of metallic and rubber dies.

The prior art teaches that mode of forming articles from sheet material in which a hard, preferably metal, forming die is placed upon the bed of a press, upon which die the blank to be formed is placed. The ram of the press is provided with a thick sheet of rubber and, upon lowering of the ram, the rubber engages the metal blank, and as the pressure is increased, the rubber flows over the surface of the metal blank, providing adequate local pressure to press the sheet blank into depressions and cavities in the metallic die. A particular object of the invention, as will be later apparent, comprises an improvement in the nature of that rubber die which is adapted to be attached to the press ram.

Further objects will be apparent from a reading of the subjoined specification and claims, together with an examination of the accompanying drawings, in which:

Figure 1:
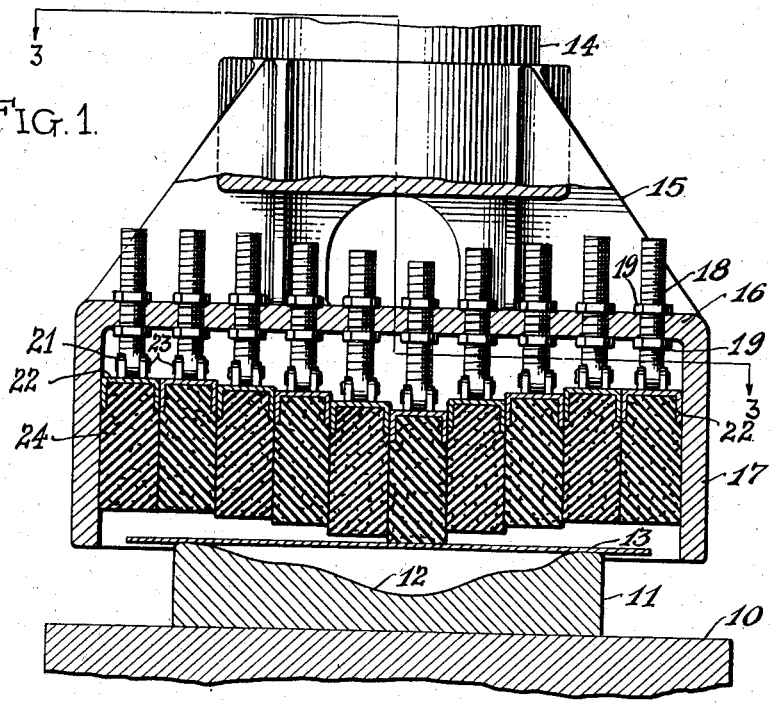
Fig. 1 is a side elevation of a press, partly in section, and showing the lower die, the metal blank, and the upper rubber die of the invention.
Figure 2:
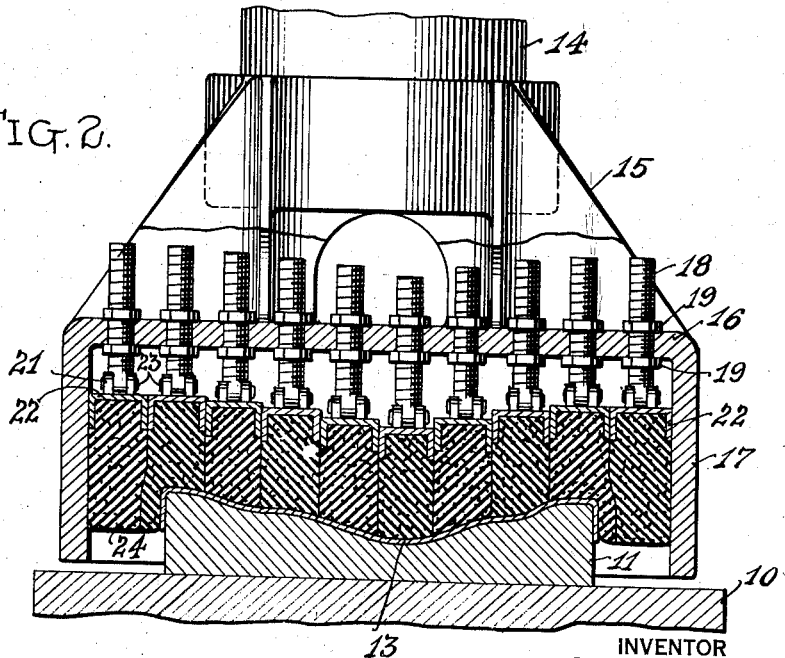
Fig. 2 is a view similar to Fig. 1, but showing the positions of the several components after the ram has been pressed upon the metal blank.
Figure 3:
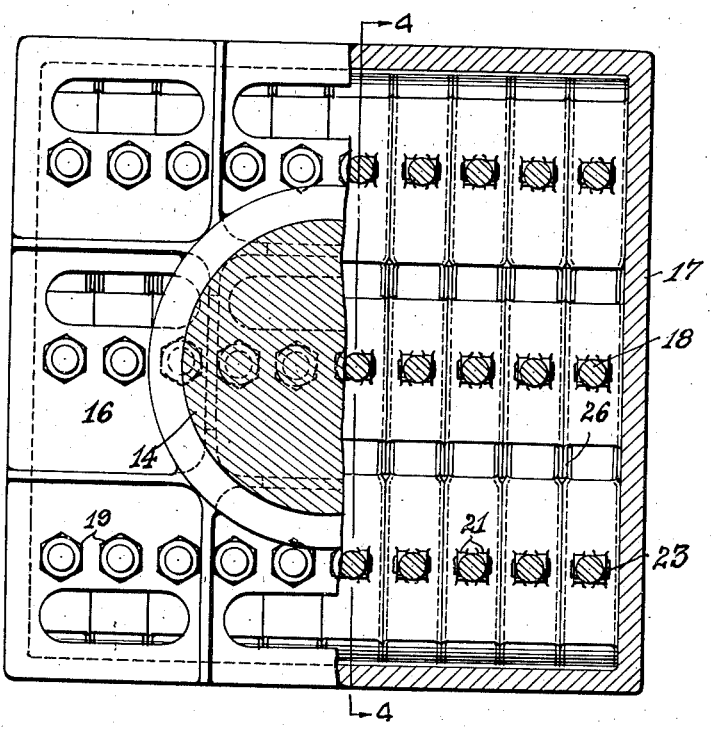
Fig. 3 is a section on the line 3—3 of Fig. 1.
Figure 4:
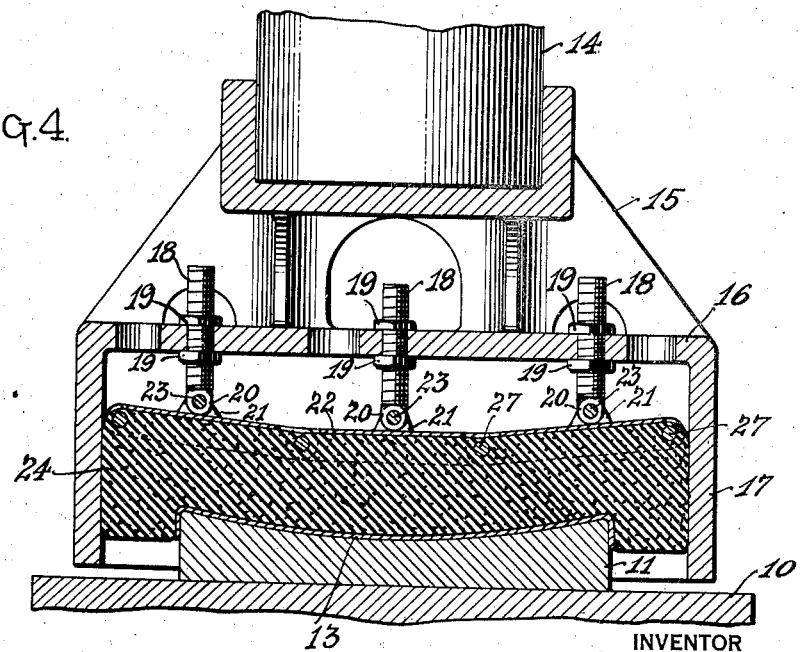
Fig. 4 is a section on the line 4—4 of Fig. 3.

A press bed is indicated at 10, upon which rests a forming die 11 having any desired form of depressions 12 in the surface thereof. As shown in Fig. 1, a flat sheet blank 13 is placed over the die 11 and over this, a press ram 14 is disposed, to the lower end of which is secured a die housing 15 comprising a plate 16 circumscribed by a depending skirt 17. The plate 16 is provided with a plurality of rows of apertures in each of which is disposed a bolt 18 which may be adjusted vertically with respect to the plate 16 by means of nuts 19 which may be run up or down the bolt according to the desired position therefor. The bottom end of each bolt is provided with an eye 20 to which is pivoted the clevis 21 of a channel element 22, the clevis and eye being secured by a bolt 23. The channel elements 22 carry rubber blocks 24 and, in the embodiment of the invention chosen for illustration, the block 24 is shown as being coextensive in length with three serially arranged channels 22, each channel being supported by one of the bolts 18. The channel flanges are arranged with overlapping ends, as shown at 26, to form hinge joints secured by pins 27, so that each rubber strip 24 comprises an articulated member which may be so adjusted as to present either a convex, concave, or tilted surface upon the lower face of the rubber block 24. As is apparent in the drawings, the series of articulated channels 22, with their attached rubber blocks, are arranged in side by side relation, and each rubber block is susceptible of a positional adjustment different from those of the other rubber blocks, but all the block units are identical in thickness and general form. As shown, there are ten rubber blocks arranged side by side, each block having three supporting bolts 18, and it will be apparent that by suitable adjustment of the aggregate 30 supporting bolts, the bottom contour of the aggregate rubber pad may be adjusted within wide limits to conform to whatever shape which may be desired in the forming die 11. The flanges of adjacent channels abut one another and slide over one another as the channels are relatively adjustable. The channel flanges thus lie against each other at all times and prevent extrusion of the pad rubber between the channels when the rubber mass is placed under high pressure.

The use of this invention minimizes wear and tear of the rubber of the upper die, since the rubber is not called upon to flow under pressure to such a great extent as would be necessary if only a single sheet of flat rubber were used, as in the prior art. When wear does occur in a rubber die pad, it is usually localized, and by the use of this invention, only those rubber blocks need be replaced which show substantial abrasion, the remaining rubber pads being left intact in the die head. When production of a plurality of pieces of a single form is called for, the contour adjustment of the rubber die head provides for more effective and rapid fabrication of the metal parts with less pressure than would otherwise be necessary. It will be apparent that the number of supporting bolts, such as 18, may be varied according to the class of work to be accomplished, and it will also be apparent that the rubber blocks may be made as individual blocks for each bolt 18, or on the other hand, a single sheet of rubber may be provided with adjustable backing plates articulated to their support members. Other variations in the teachings above outlined will readily occur to those skilled in the art.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a metal forming press adapted to receive metal forming dies of different contour, a universal die secured to the press for engagement with any one of said first dies comprising a plurality of substantially parallel rows of channel elements; the elements of each row being hinged to the adjacent elements at their ends, a bolt clevised to each element, a plate opposite the forming die having a plurality of rows of spaced holes each adapted to receive the bolt of one said element, means to anchor each bolt adjustably to the plate whereby its associated element may be spaced close to or remote from the plate, and rubber blocks gripped in the channels of said elements in facing relation to the forming die.

2. In a forming press, a forming die having length and width and having variations in its height both lengthwise and widthwise thereof, a support structure opposite said die having substantially the same length and width, a plurality of elements arranged in lengthwise and widthwise rows between said support structure and die, and a means of adjustable length securing each element to said support structure, said means in the aggregate being adjustable to conform the surfaces of the elements substantially to the longitudinal and transverse profiles of said die.

3. In a forming press, a forming die having length and width and having variations in its height both lengthwise and widthwise thereof, a support structure plate opposite said die having substantially the same length and width, a plurality of elements arranged in lengthwise and widthwise rows between said support structure and die, a means of adjustable length securing each element to said support structure, said means in the aggregate being adjustable to conform the surfaces of the elements substantially to the longitudinal and transverse profiles of said die, and resilient blocks secured to said elements for engagement with a work sheet overlying the die.

4. In a forming press, a forming die having length and width and having variations in its height both lengthwise and widthwise thereof, a support structure opposite said die having substantially the same length and width, a plurality of elements arranged in lengthwise and widthwise rows between said support structure and die, a means of adjustable length securing each element to said support structure, said means in the aggregate being adjustable to conform the surfaces of the elements substantially to the longitudinal and transverse profiles of said die, and means to hingedly articulate said elements in end-to-end relation.

5. In a forming press, a forming die having length and width and having variations in its height both lengthwise and widthwise thereof, a support structure opposite said die having substantially the same length and width, a plurality of elements arranged in lengthwise and widthwise rows between said support structure and die, and a means of adjustable length securing each element to said support structure, said means in the aggregate being adjustable to conform the surfaces of the elements substantially to the longitudinal and transverse profiles of said die, said elements having such depth at their edges as to be relatively adjustable in spacing relative to the support structure through a substantial distance while some portion of the edge of each element engages some portion of the edge of the next adjacent, differently adjusted element.

CHARLES P. TRUDELL.